(12) United States Patent
Hayashi et al.

(10) Patent No.: US 6,754,155 B1
(45) Date of Patent: Jun. 22, 2004

(54) INFORMATION RECORDING MEDIUM AND INFORMATION PROCESSING DEVICE

(75) Inventors: Nobuhiro Hayashi, Kanagawa (JP); Hiroaki Yada, Kanagawa (JP); Munekatsu Fukuyama, Tokyo (JP)

(73) Assignee: Sony Corporation, Tokyo (JP)

( * ) Notice: Subject to any disclaimer, the term of this patent is extended or adjusted under 35 U.S.C. 154(b) by 529 days.

(21) Appl. No.: 09/632,283

(22) Filed: Aug. 3, 2000

(30) Foreign Application Priority Data

Aug. 4, 1999 (JP) .......................................... 11-220898

(51) Int. Cl.[7] ................................................ G11B 5/09
(52) U.S. Cl. ...................... 369/53.21; 369/60; 369/48
(58) Field of Search ...................... 360/69, 48, 77.07, 360/77.08, 60, 77.05; 369/53.2, 53.21, 30.1, 30.21, 59.23, 275.3, 27.01, 30.03, 30.05, 30.19, 47.13; 711/163, 164; 380/203, 239, 277

(56) References Cited

U.S. PATENT DOCUMENTS 6,317,281 B1 * 11/2001 Ogawa et al. ................. 360/60
6,337,779 B1 * 1/2002 Shirane ........................ 360/69
6,411,452 B1 * 6/2002 Cloke ....................... 360/77.08

* cited by examiner

*Primary Examiner*—Thang V. Tran
(74) *Attorney, Agent, or Firm*—Frommer Lawrence & Haug LLP; William S. Frommer; Hans R. Mahr (57) ABSTRACT

An information recording medium and information processing device are provided so that recording medium-identifying ID information cannot be rewritten. Unique ID information specific to a recording medium is recorded in a servo zone, which is not a data zone in which data recording/reproduction can be performed. After the medium is installed in the disk drive, a user cannot rewrite the recorded ID information and can only read it. When information distributed via a network is stored in a storage device, the ID in the servo zone is verified so that the information can be stored in the storage device only when the storage device is properly licensed.

4 Claims, 8 Drawing Sheets

INFORMATION RECORDING MEDIUM AND INFORMATION PROCESSING DEVICE

BACKGROUND OF THE INVENTION

1. Field of the Invention

This invention relates to a disk-shaped information recording medium and information processing device which can record and reproduce data such as a magnetic disk or optical disk. In particular, it relates to a digital data recording and reproducing device which can record and reproduce data digitally, wherein, when information such as music or images are received via a network, broadcast or other recording medium, and this information is recorded by a magnetic disk device or the like connected to a personal computer, unauthorized copying is prevented and the authors copyright is protected.

2. Description of the Related Art

In recent years, network data distribution systems are becoming popular. In these systems, information such as music or images are distributed via a network or broadcast, the distributed information is received via the Internet, and received information is displayed on the monitor of an individual's personal computer, or recorded by a magnetic disk or magneto-optic disk device connected to the personal computer.

It is understood that, from the viewpoint of a copyright owner providing information, it is generally acceptable for a user who has a personal computer connected to the Internet, for example, to display received digital information on the computer's monitor. However, special authorization from the copyright owner may be required to record this information on a magnetic disk, magneto-optic disk or other recording medium. One way of restricting the recording of distributed information on an individual's magnetic disk, magneto-optic disk or other recording medium, for example, might be to store a key showing whether recording of information on the disk device was authorized or not. This key would be used to verify whether or not the disk device was an authorized device, i.e., whether or not it was a device licensed by the information provider. When the device was confirmed to be an unauthorized device, information recording on this disk device would be permitted.

When information is transmitted between an information provider and an information receiving device which receives the transmitted information and attempts to record it, one method of verifying whether or not the receiver's device is an authorized device, i.e., whether or not a receiver's device is a licensed device, is to embed unique information (ID information) to identify the information storage device or recording medium in the system on the information receiving side.

The information provider distributes information, and a check is performed based on this unique information (ID information) as to whether the device is a properly licensed device as regards information transmitted between the information provider and information receiving device. If it is verified that this is a properly licensed device, recording is performed normally, and if it is not a properly licensed device, recording is not performed.

Alternatively, there is another method wherein recording of information is permitted on any device, but if the information is found to be an unauthorized copy when a license check is performed, reproducing does not take place. Unique information to identify the medium or device is recorded at a predetermined position of the data recording part of the medium when it is shipped to prevent duplication.

Figure 8:
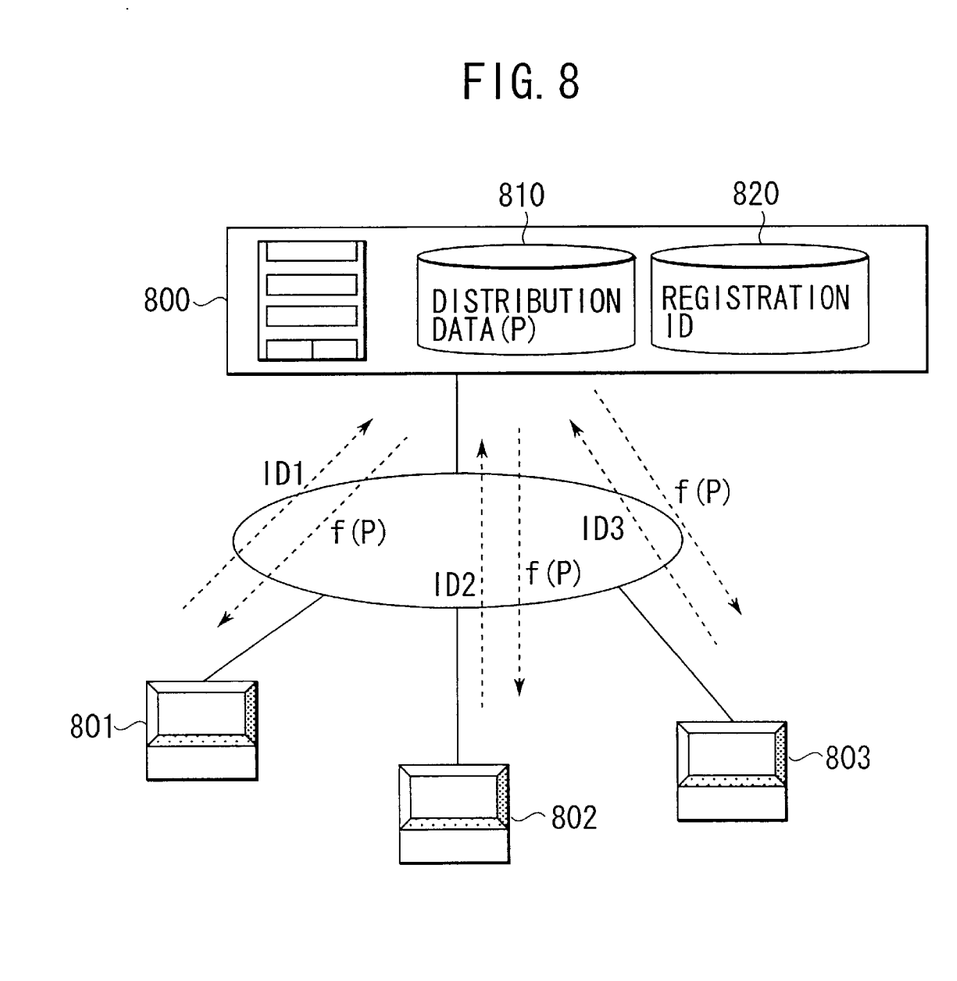
FIG. 8 is a drawing describing information distribution and recording in a storage device according to the related art.

An example of illegal copy prevention in the case of data transmission via the Internet is shown in FIG. 8.

In the layout shown in FIG. 8, an information provider 800 is connected to plural information receiving users aid 801, 802, 803 via the Internet, transfer of information between the users being possible.

Information is received from the information provider 800, and a user attempting to store the received data on a storage device such as a hard disk attached to the user's personal computer, sends a data distribution request to the information provider 800 via the Internet, and sends his own ID to the information provider 800.

When the information provider 800 receives the ID from the user, it is compared with IDs registered in an ID database 820. If a matching ID is registered in the ID database 820, the data distribution request is considered to be from a properly licensed user, so data (P) is extracted from a distribution database 810 and provided to the user. The data may for example be encoded and transmitted as f(P).

If there is no matching ID as a result of comparing the ID from the user with the IDs registered in the ID database 820, it is determined that the data request is not from a properly licensed user, and data transmission is not performed.

In this system, the information receiving users 801, 802, 803 are generally individual personal computers comprising a data transmission means, and provided with a device such as a magnetic disk for recording data. The user's ID is either created by the user himself, or it is unique system information (ID information) which is pre-recorded at a predetermined position of a data recording part of the medium when it is shipped.

The information provider 800 first concludes a license agreement with the user, and registers personal information (ID information) relating to the licensed information receiving users 801, 802, 803 in the ID database 820 on that occasion. The information provider 800 compares the ID information transmitted from the information receiving users 801, 802, 803 with the registered IDs, and determines whether or not the two match. If they do match, it is confirmed that the user is an authorized user. The data is then for example encoded by a predetermined key k, and transmitted to the information receiving users 801, 802, 803.

This key k may for example be a value k (=f (ID) generated by applying a predetermined function f to the device ID transmitted by the information receiving users 801, 8 02, 803. Likewise, in an information receiving device 702, the function f is applied to the ID to generate the key k (=f (ID). The key k may then be used to decode encoded audio or image data transmitted from the information provider.

However, in this related art construction, the individual ID (ID information) of the user's information receiving device is set by the user, or is recorded at a predetermined position of a data recording part of the medium when it is shipped. This arbitrarily set ID or ID recorded in a data recording region of the data recording medium can easily be rewritten. An ID recorded in the data part of a recording medium such as a hard disk can be rewritten from the host computer by a user operation, and is therefore prone to falsification.

To prevent illegal ID falsification, it is also possible to prevent rewriting of a part in which the ID is recorded, for example by a program which controls disk drives, however, there still remains the possibility that somebody wishing to make an illegal copy will rewrite the control program so that the data in this area can be rewritten.

As a result, another possibility is that unauthorized recording of received data may take place by an unauthorized user rewriting the ID in one electronic device to modify it to an ID of a properly licensed user. Yet another possibility is that an authorized ID will be copied to plural devices, thereby permitting illegal recording of received data in plural devices.

There was therefore a problem in that the method of recording ID information in the data part of a medium in a related art system could not entirely prevent illegal copying.

SUMMARY OF THE INVENTION

It is therefore an object of this invention to resolve the above problems inherent in the related art, and provide an information recording medium wherein ID information cannot be rewritten, or an information processing device comprising such an information recording medium.

A first aspect of this invention, which was conceived to overcome the above problems, is:

a disk-shaped information recording medium permitting data recording and reproducing, the disk-shaped information recording medium comprising:

a data zone permitting data recording and reproducing, and a servo zone for recording servo information for positioning a head which performs data recording or reproducing relative to the information recording medium, wherein ID information for identifying the information recording medium is recorded in the servo zone.

In one variation of the information recording medium of this invention, the disk-shaped information recording medium has a construction in which plural data zones and plural servo zones are formed alternately, and the ID information is recorded in at least one servo zone of the plural servo zones.

In another variation of the information recording medium of this information, the ID information forms one piece of ID information by linking recorded information in plural servo zones.

In another variation of the information recording medium of this invention, the servo zone comprises a track address recording region in which a track address for identifying a disk data track is recorded, and the ID information is recorded in the track address recording region.

In another variation of the information recording medium of this invention, the same ID information is recorded in different servo zones of the plural servo zones.

In another variation of the information recording medium of this invention, the same ID information is recorded in servo zones of different surfaces of the disk-shaped information recording medium.

In another variation of the information recording medium of this invention, the same ID information is recorded in regions at different radial positions of a servo zone on the same surface of the disk-shaped information recording medium.

A second aspect of this invention is an information processing device comprising a disk-shaped information recording medium permitting data recording and reproducing, wherein the disk-shaped information recording medium comprises:

a data zone permitting data recording and reproducing, and a servo zone for recording servo information for positioning a head which performs data recording or reproducing relative to the information recording medium, wherein ID information for identifying the information recording medium is recorded in the servo zone.

In one variation of the information processing device of this invention, the information processing device comprises a means for performing data recording and reproducing to and from the information recording medium, and ID information read means for reading the ID information from the servo zone.

In another variation of the information processing device of this invention, the ID information read means reads the ID information recording servo zone data as ID information based on ID information recording servo zone region information of the information recording medium on which ID information is recorded.

In another variation of the information processing device of this invention, the ID information read means comprises a means for executing an ID information read program generated in correspondence with the ID information recording servo zone region information.

In another variation of the information processing device of this invention, the information processing device comprises an ID comparison means for performing a comparison of license information generated based on the ID information and the ID information when distribution information from an external information providing means is recorded on the information recording medium, and a storage enabling means which enables storage of information from the external information providing means on the information recording medium only when it is confirmed that the license information is information created based on the ID information as a result of the comparison in the ID comparison means.

In another variation of the information processing device of this invention, the storage enabling means is a decoding means which performs decoding of encoded information from an information providing means, and which decodes encoded information from an external information providing means only when it is confirmed that the license information is information created based on the ID information as a result of the comparison in the ID comparison means.

In another variation of the information processing device of this invention, the information processing device records distribution information from an external information providing means on the information recording medium, and comprises an ID comparison means for performing a comparison of license information generated based on the ID information and the ID information when the recorded information is played back, and reproducing enabling means which enables reproducing of recorded information recorded on the information recording means only when it is confirmed that the license information is information created based on the ID information as a result of the comparison in the ID comparison means.

In another variation of the information processing device of this invention, the reproducing enabling means is a decoding means which performs decoding of encoded information from an information providing means, and which decodes encoded information recorded on the information recording medium only when it is confirmed that the license information is information created based on the ID information as a result of the comparison in the ID comparison means.

According to the information recording medium and information processing device of this invention, when copyrighted information such as audio information or image information is recorded and played back to and from a recording device, the process of storage or reproducing on a device or medium other than a properly licensed device can be made very difficult, properly licensed user devices can be identified with a higher degree of certainty, and an information provider's information can be recorded only by properly licensed users.

According to the information storage medium and information processing device of this invention, medium-specific ID information is recorded in a servo zone different from a data recording/reproducing zone. When this medium is installed in a storage device, the ID information cannot be rewritten and can only be reproduced. Storage in the storage device is subject to verification of the ID, hence unauthorized data storage can be prevented Further, according to the information storage medium and information processing device of this invention, a servo writer, which is a special expensive piece of equipment, is used to record the medium-specific ID information in the servo zone, so rewriting of the ID or falsification by the general user can be prevented.

Still further, according to the information storage medium and information processing device of this invention, by encoding distribution data and decoding this data using a decoding key based on the unique ID recorded in a servo zone of the storage device, only users who have received a valid license, i.e., users who own a recording medium which has definitely been identified, are permitted to perform storage or reproducing of the decoded data.

DESCRIPTION OF THE PREFERRED EMBODIMENTS

The information recording medium and information processing device of this invention will now be described in more detail. In the following embodiments, a magnetic disk was taken as an example of an information recording medium, but the invention is not limited to a magnetic disk device, and can be applied to all information recording media which permit data recording and reproducing such as magneto-optic disks and optical disks.

Figure 1:
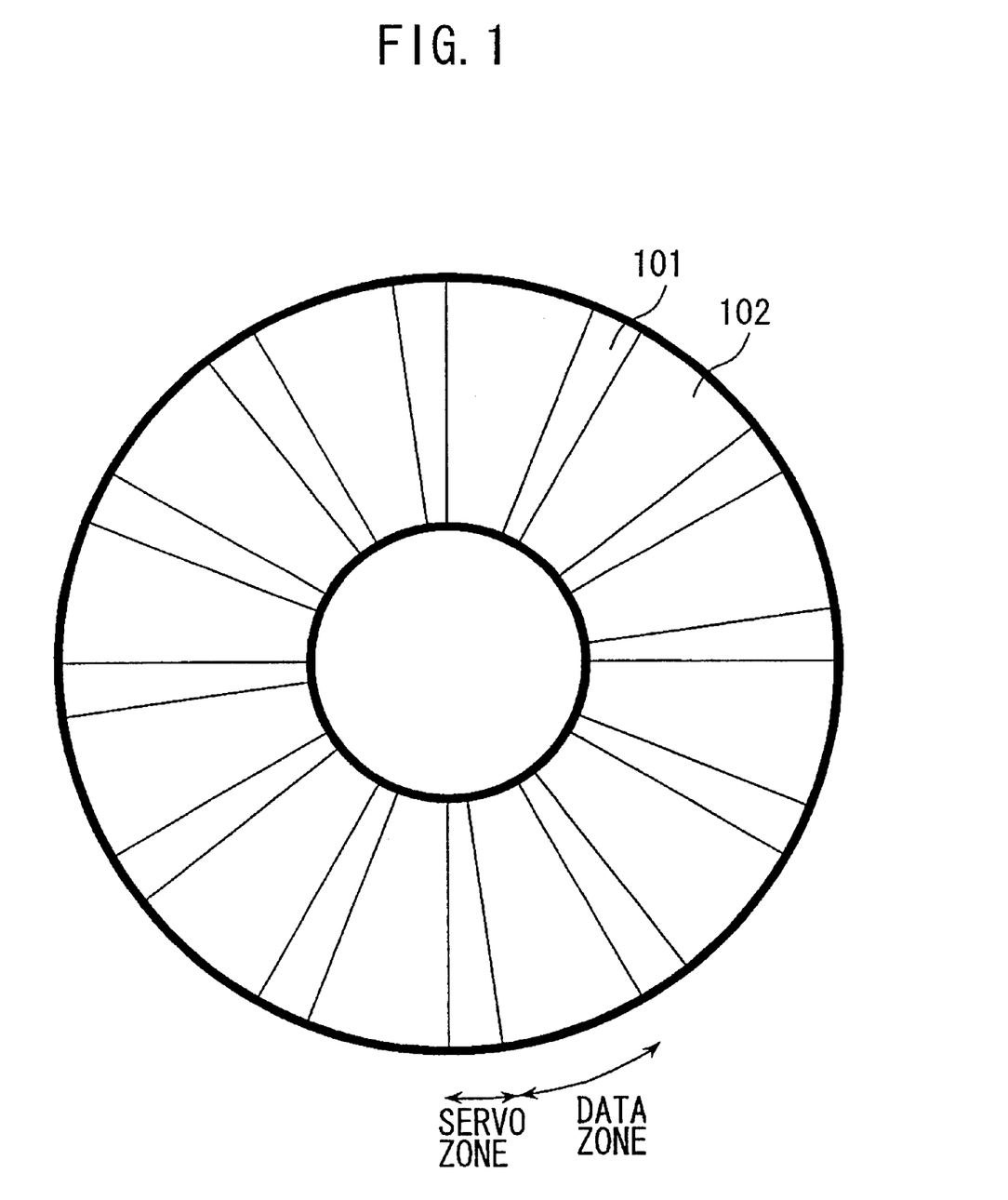
FIG. 1 is a drawing showing the disk format in a magnetic disk which can be used as an information storage medium, and in an information processing device comprising such an information storage medium.

FIG. 1 shows a magnetic disk which may be used in the information processing device of this invention.

The magnetic disk shown in FIG. 1 has a construction wherein servo zones 101 and data zones 102 are disposed alternately. In FIG. 1, a small number of the servo zones 101 are shown to avoid complexity, but in an actual disk, there may be several dozen to several hundred servo zones in one disk. In one (or more) of these servo zones, a reference point in the disk circumferential direction, i.e., a special pattern showing a home index, is recorded in a region where the track addresses are recorded.

Figure 2:
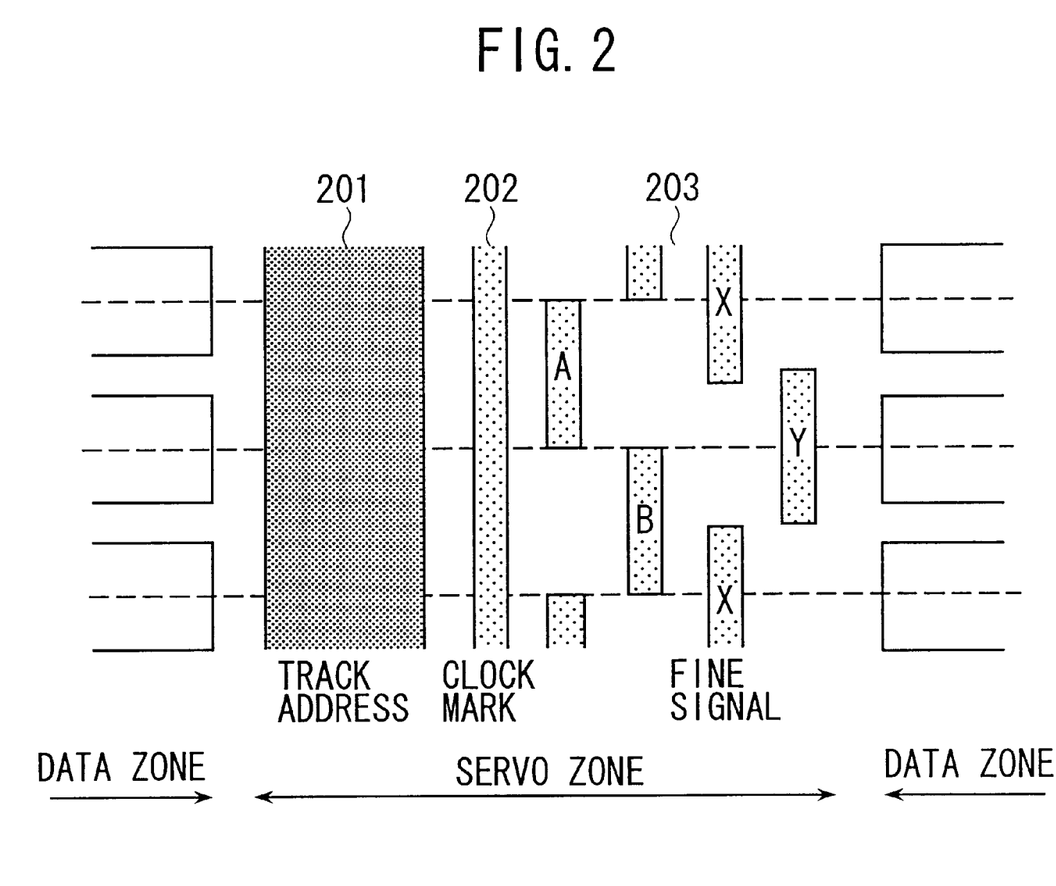
FIG. 2 is a drawing showing the layout of servo zones in the magnetic disk which can be used as an information storage medium, and in the information processing device comprising the information storage medium.

FIG. 2 shows the detailed features of a servo zone. As shown in FIG. 2, various marks or patterns are recorded or formed to position a head at a predetermined position of the disk so as to permit data writing and reproduction.

A track address 201 used to generate a servo signal for rough positioning during so-called seek operations, and a fine signal 203 used to generate a servo signal for fine positioning such as retaining an on-track state, are recorded in the servo zone. A clock mark 202 is further provided, which is used for clock generation. To generate a clock of high precision and obtain a sufficient servo signal, several hundred servo regions are provided in each circular track which are disposed at equidistant intervals.

The various types of signals in the aforesaid servo zone 101 will now be described. An isolated waveform is reproduced from the clock mark 202. In the isolated waveform, clock information synchronized with the disk rotation is for example obtained from a time at which a peak appears.

The track address 201 is a magnetic head positioning servo required in the track seek mode which moves the head to the target track. The track address 201 is formed as a pattern having a different length and arrangement for each track by for example encoding the track address with a gray code or the like.

The fine signal 203 is a magnetic head positioning servo required in the tracking mode which positions the head precisely in the center of the target track, and is a pattern showing the relative position of the head to the track. It comprises four magnetic patterns, A, B, X, Y.

To establish initial synchronization, i.e., in order that the device operates in synchronism with the clock mark 202, the reference point in the circumferential direction of the disk mentioned above, i.e., a special unique pattern, is detected. This unique pattern is a synchronization assist pattern used to detect the approximate position of the clock mark, and several tens of such patterns are recorded in one circular track in the track address region of the disk. To detect this unique pattern, the following method may for example be used.

First, binary data is detected from the reproduction signal reproduced from the disk medium. For this purpose, the reproduction signal is converted to a digital signal by an A/D converter, and then converted to binary data by a threshold value detector or Viterbi decoder. The Viterbi decoder performs Viterbi decoding on a sample sequence obtained as decoding data. The threshold value detector or Viterbi decoder is provided in, for example, a unique pattern detecting circuit.

From the binary data generated in this way, the unique pattern is recognized by, for example, the following method. The unique pattern detecting circuit prestores a binary data pattern reproduced from the unique pattern. Then, if the binary data pattern detected by Viterbi decoding in the initial synchronization operation and this prestored binary data pattern match, it is determined that the pattern was detected.

After a predetermined time has elapsed from when the unique pattern was detected, the unique pattern detecting circuit creates a window, and detects the isolated waveform reproduced from the clock mark 202. Clock information can then be generated as described above based on the isolated waveform detected in this way.

In the magnetic disk device, a recording or reproducing means such as a magnetic head is moved to a predetermined track based on the reproduced signals from various patterns formed in the servo zone on the aforesaid disk medium, and while performing tracking to the center of each track, recording/reproduction of data is performed in synchronism with the clock.

A pattern showing a rotation reference point on the magnetic disk is referred to as a home index pattern, and one of them is normally recorded in the track address region instead of the aforesaid unique pattern in each circular disk trace. By detecting the home index and then counting the number of servo zones from this point, the position in the circumferential direction can be specified.

This servo information in the server zones is prerecorded by a device known as a servo writer before the storage medium such as a magnetic disk is installed in the storage device, i.e., before it is installed in a magnetic disk drive. In the servo writer, a means to position the head precisely and a means to acquire a precise timing are provided which allow high precision servo information to be recorded on the recording medium by fine control.

In the disk drive housing a disk on which this servo information is written, the head reads the servo information so as to find a disk radial position and circumferential position. The relative position of the head to the disk can therefore be specified, data can be written to a predetermined position, and data reading can be performed.

In the information recording medium of this invention, for example a magnetic disk, unique information (ID information) to specify the medium is also recorded in the servo zone 101. The unique information (ID information) to specify the medium is recorded in the server zone 101 which is not a data zone for recording ordinary data, i.e., in a part of the region where the track addresses are recorded. This ID information is recorded at a predetermined position during a servo information recording sequence performed by the servo writer.

The unique information (ID information) to specify the medium may for example be a serial number which is unique for different media. Due to the assignment of this serial number, all information recording media or all personal computers in which these information recording media are installed, may be individually identified.

Figure 3:
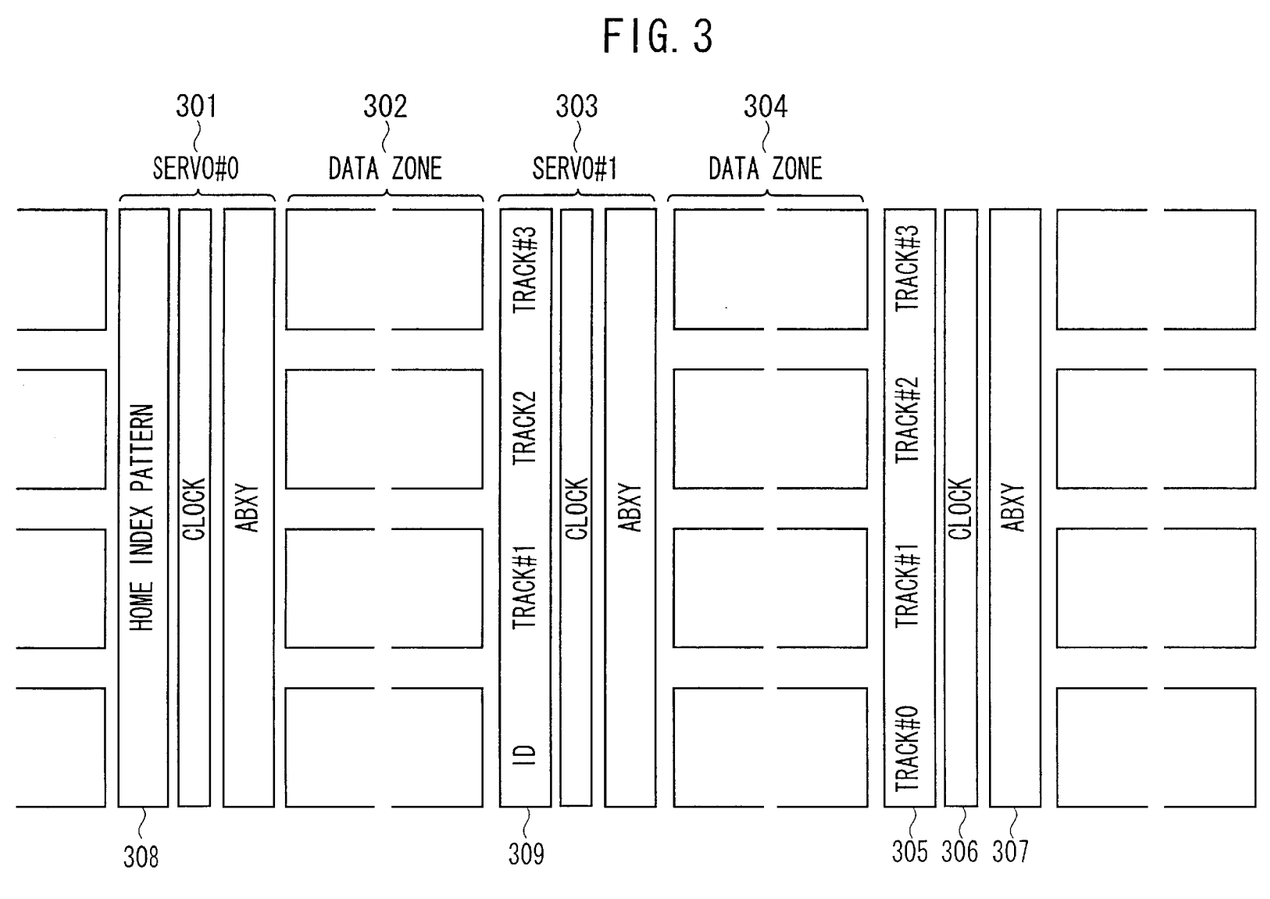
FIG. 3 is a typical arrangement sequence of ID information in the disk in the information storage medium and information processing device of this invention (1).

FIG. 3 shows an example of the format of a magnetic disk as an example of the information recording medium of this invention. FIG. 3 schematically shows part of a magnetic disk where data zones and servo zones are arranged alternately, the servo zone on the left-hand side [Servo 0#] 301 being the server zone comprising the home index. A data zone 302 is provided adjacent to [Servo #0] 301 on the right, followed by a servo zone [Servo #1] 303, data zone 304 and data zones and servo zones arranged alternately thereafter.

In each servo zone, a track address 305, clock mark 306 and fine signal 307 are formed in the same way as the servo zone shown in FIG. 2, as described above. A home index 308 is also formed in the servo zone [Servo #0] 301.

As shown in FIG. 3, in the servo zone [Servo #1] 303 which is the next servo region after the servo region comprising the home index with a track address 0, the unique information (ID information) to specify the medium which is a feature of the information recording medium of this invention, is recorded as unique ID information 309. As shown in FIG. 3, the unique ID information 309 is recorded in a region at a track address position of the servo zone [Servo #1] 303 where address data for the track 0 would be recorded.

As described above, the track address is a positioning servo for the magnetic head which is required in the track seek mode wherein the head is moved to a target track. Several tens to several hundreds of track addresses are recorded in every circular trace of the disk so that even if track addresses are not recorded in a few positions, track seek can still be performed without any problem using the remaining track addresses.

The ID recording region in which the unique ID information 309 to specify the medium is recorded, has a recording position which is fixed in advance. Therefore, the magnetic disk drive which drives the disk in which this ID information is embedded must be able to identify that this information is the ID information when it plays back the servo region comprising the ID recording region. For example, the unique ID information 309 is read by a program which reads recording data at the track address position of track 0 in a specific disk region, i.e., the servo region in which the unique ID information 309 is embedded, which in the example shown in FIG. 3 is the servo region, [Servo #0]. This ID information reading program must be able to read data in the servo region corresponding to the region in which the ID information is recorded.

The position at which the unique ID information is written is a region where a track address should normally be written, and it is read also when servo information is read during data recording/reproduction in the data zones. However, as described above, several tens to several hundreds of track addresses are recorded in every circular trace of the disk, and even if track addresses are missing at a few places, track seek can still be performed, even if information different from servo information such as ID information is read during a seek operation, by reading the correct track addresses written in other servo zones.

When necessary, using the aforesaid ID information reading program, the magnetic disk drive reads the unique ID information 309 as information specifying the medium.

The unique ID information 309 is recorded in a servo zone by a servo writer in the same way as servo signals in the servo zones. In other words, it is recorded by an identical procedure to that used for the data in the servo zones.

Once the magnetic recording medium on which this unique ID information is recorded has been installed in, for example, a magnetic disk drive or a personal computer, a new ID cannot be recorded, and the ID cannot be rewritten or erased. Therefore, an ordinary user who has purchased a magnetic disk drive cannot illegally rewrite this ID information.

Therefore, even in a system where an information provider of music or images distributes information to a large unspecified number of receivers via a network such as the Internet, when this information is recorded on a storage device, illegal copying is prevented by identifying the ID information in each case.

The unique ID information requires a large number of bits to identify the medium, so one ID information can also be recorded using several servo regions, either continuously or in discrete "jumps", on the disk.

For example, if 12 bits are assigned to each servo zone as a track address recording region, and this is used as an ID information recording region, only 12 bit identification numbers, i.e. up to 4096, can be used. When for example serial numbers are assigned as medium-specific information, it may therefore occur that not enough serial numbers are available.

Figure 4:
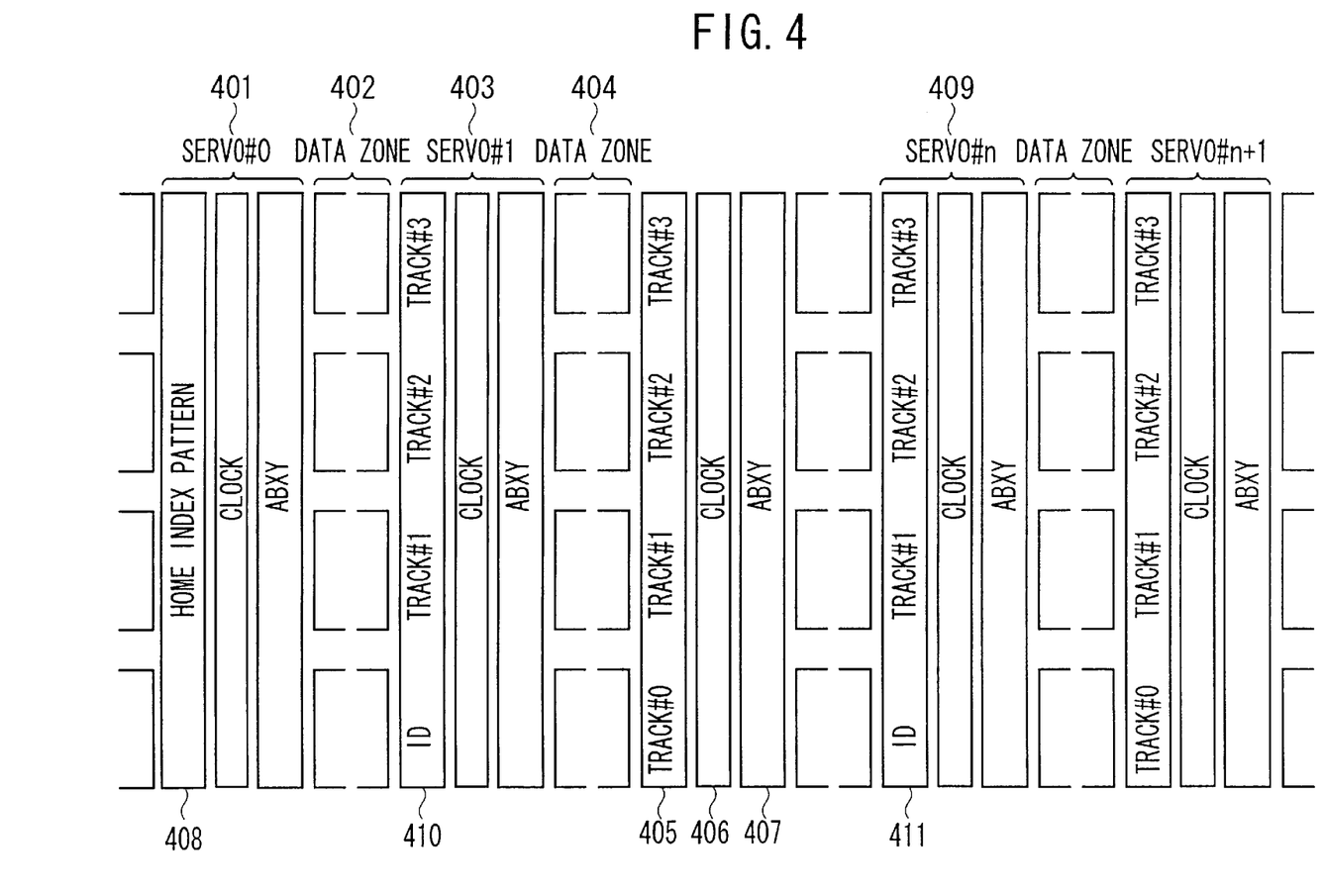
FIG. 4 is a typical arrangement sequence of ID information in the disk in the information storage medium and information processing device of this invention (2).

Hence, as for example shown in FIG. 4, one ID information can be recorded in two servo zones, i.e., the next servo zone after the home index and the nth servo zone. Alternatively, three or more servo zones can be used as the ID information recording region, e.g., the first servo zone after the home index, the mth servo zone after the home index and the nth servo zone after the home index.

Thus, when unique ID information is recorded using plural servo zones, the ID information reading program reads servo region data corresponding to the regions in which the ID information was recorded. Specifically, the program must be able to read track address data at the position where the ID information is recorded, i.e., the ID information, depending on the number of the track address region in which the ID information is recorded after the home index.

As another example of the information recording medium of this invention, FIG. 4 shows an example of a magnetic disk format in which two servo zones comprise the ID information recording region. As in the case of FIG. 3, FIG. 4 schematically shows part of the magnetic disk in which data zones and servo zones are arranged alternately, the servo zone on the left-hand side [Servo 0#] 401 being the servo zone comprising the home index. A data zone 402 is provided adjacent to [Servo #0] 401 on the right, followed by a servo zone [Servo #1] 403, data zone 404 and data zones and servo zones arranged alternately thereafter.

In each servo zone, a track address 405, clock mark 406 and final signal 407 are formed. A home index 408 is also formed in the servo zone [Servo #0] 401.

As shown in FIG. 4, in the servo zone [Servo #1] 403 which is the next servo zone after the servo zone comprising the home index with a track address 0, unique ID information 410 is recorded as unique information (ID information) to specify the medium, which is the characteristic feature of the information recording medium of this invention. Further, unique ID information 411 is also recorded in the nth servo zone [Servo #n] 409. In the example shown in FIG. 4, one piece of unique ID information is formed by the unique ID information 410 and the unique ID information 411 recorded in the servo zone [Servo #1] 403 and the servo zone [Servo #n] 409.

The ID recording regions in which this unique ID information 410, 411 to specify the medium is recorded, are fixed in advance. Therefore, when the magnetic disk drive plays back the servo region comprising this ID recording region using for example the ID information read program described above, the ID information can be identified as such.

When the magnetic disk drive requires the unique ID information 410, 411 as information to specify the medium, it reads this information using the aforesaid ID information read program, and does not use the unique ID information as servo information.

As in the case of servo signals in the servo zones, the unique ID information 410, 411 is recorded in the servo zones by a servo writer.

Once the magnetic recording medium on which this unique ID information is recorded has been installed in, for example, a magnetic disk drive or a personal computer, a new ID cannot be recorded, and the ID cannot be rewritten or erased by ordinary data recording and reproduction functions. Therefore, an ordinary user who has purchased a magnetic disk drive cannot illegally rewrite this ID information.

If the track address regions of two servo zones are used as the ID information recording region as shown in FIG. 4, and the track address of one servo zone is 12 bits, 24 bits of different ID information can be written in total. Further, if four servo zones are used as ID information recording regions, 48 bits of information can be recorded in total, giving $2^{48} \approx 2 \times 10^{14}$ different combinations.

As the home index must have a different pattern to these ID information patterns, the patterns used for ID information are different patterns to those of the home index pattern.

To prevent a situation arising where the ID information cannot be reproduced due to scratches, etc., on the disk, the same ID information may be recorded in duplicate in different plural locations of a region. If this construction is adopted, reading of the ID information can be performed more securely and effectively. For example, reading of the ID information can be performed more securely by recording the same ID information at plural locations in servo zones on different surfaces of the disk or different surfaces of the information recording medium, or in the inner circumferential area and outer circumferential area of the disk, i.e., at a different radial position of a servo zone of the disk.

Figure 5:
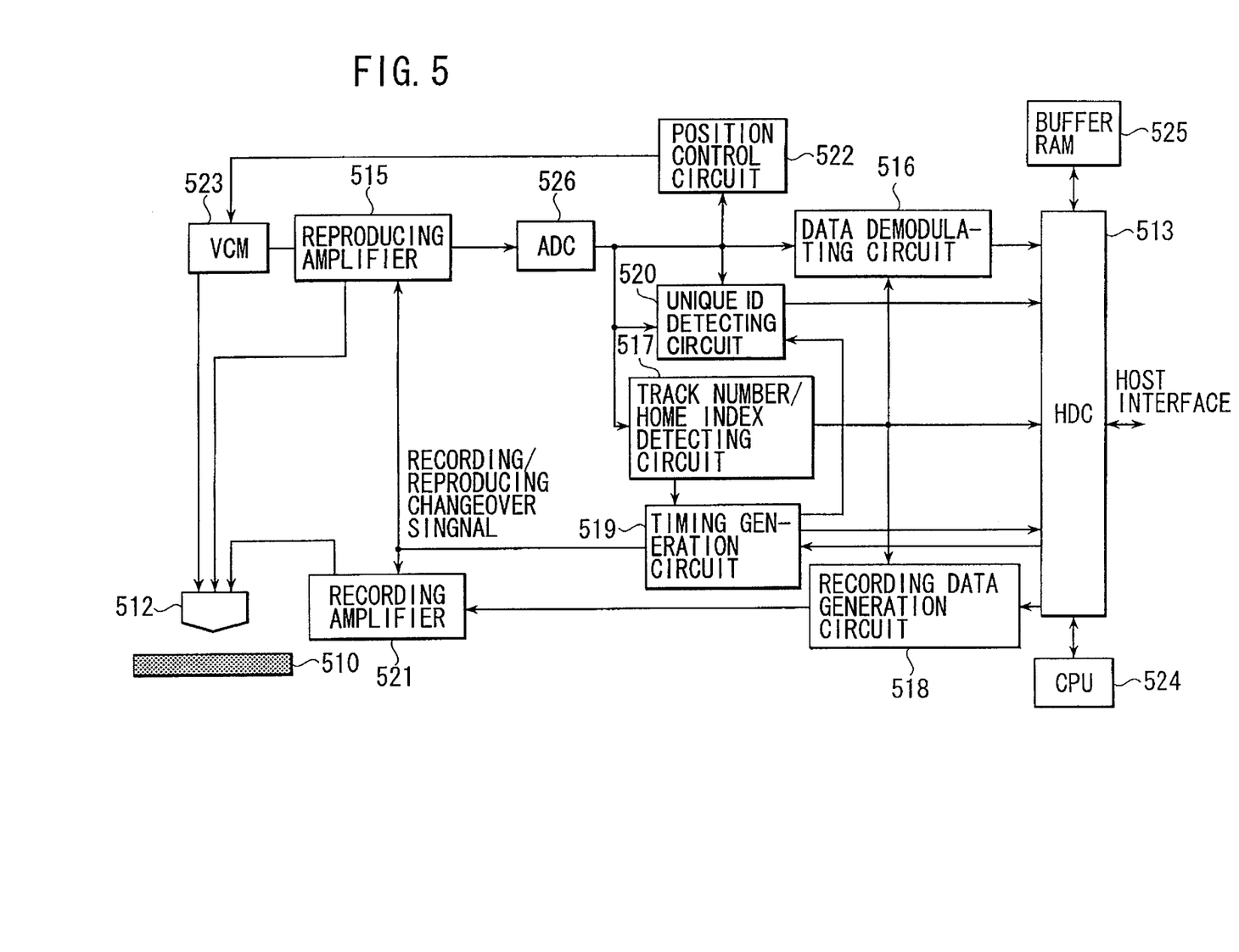
FIG. 5 is a block diagram showing an example of the configuration of the information processing device of this invention.

FIG. 5 shows a block diagram of one embodiment of the magnetic disk device according to this invention. The action of the magnetic disk device according to this invention will now be described using the block diagram of FIG. 5.

First, the signal flow will be described when address information in the servo zones is used for ordinary head position control.

After a signal reproduced by the reproducing head 512 from a magnetic disk 510 is amplified by a reproduction amplifier 515, it is converted to a digital signal by an A/D converter (ADC) 526.

The signal converted by this A/D converter (ADC) 526 is input to a position control circuit 522 which detects a tracking servo signal and performs position control based thereon, and the head 512 is position controlled by driving a VCM (voice coil motor) 523.

From the digital signal converted by the A/D converter (ADC) 526, the track number is specified, and the radial position and circumferential position are specified by a home index detector 517.

In this way, the head 512 is moved to a desired position relative to the disk 510 based on the servo information in the servo zones, and data recording/reproduction is performed.

Next, the signal flow will be described when the unique ID information of the disk device according to this invention is read.

A command from a host computer is received via a host interface, and when a hard disk controller (HDC) 513 receives a command to read unique ID information, the head 512 is moved to a predetermined track by a position control circuit 522, and the signal is reproduced from the servo zone in which the unique ID information was recorded. The servo zone in which the unique ID information is recorded, is specified by the ID information read program which reads a track address data region of one servo zone as the ID information recording region, or track address data region of plural servo zones as the ID information recording region.

From this read signal, the unique ID information is reproduced by a unique ID detecting circuit 520, and the hard disk controller (HDC) 513 transfers it to the host computer via the host interface.

Next, the processing will be described when music information or image information, etc., is received using this drive on which the unique ID information was recorded by referring to FIG. 6.

Figure 6:
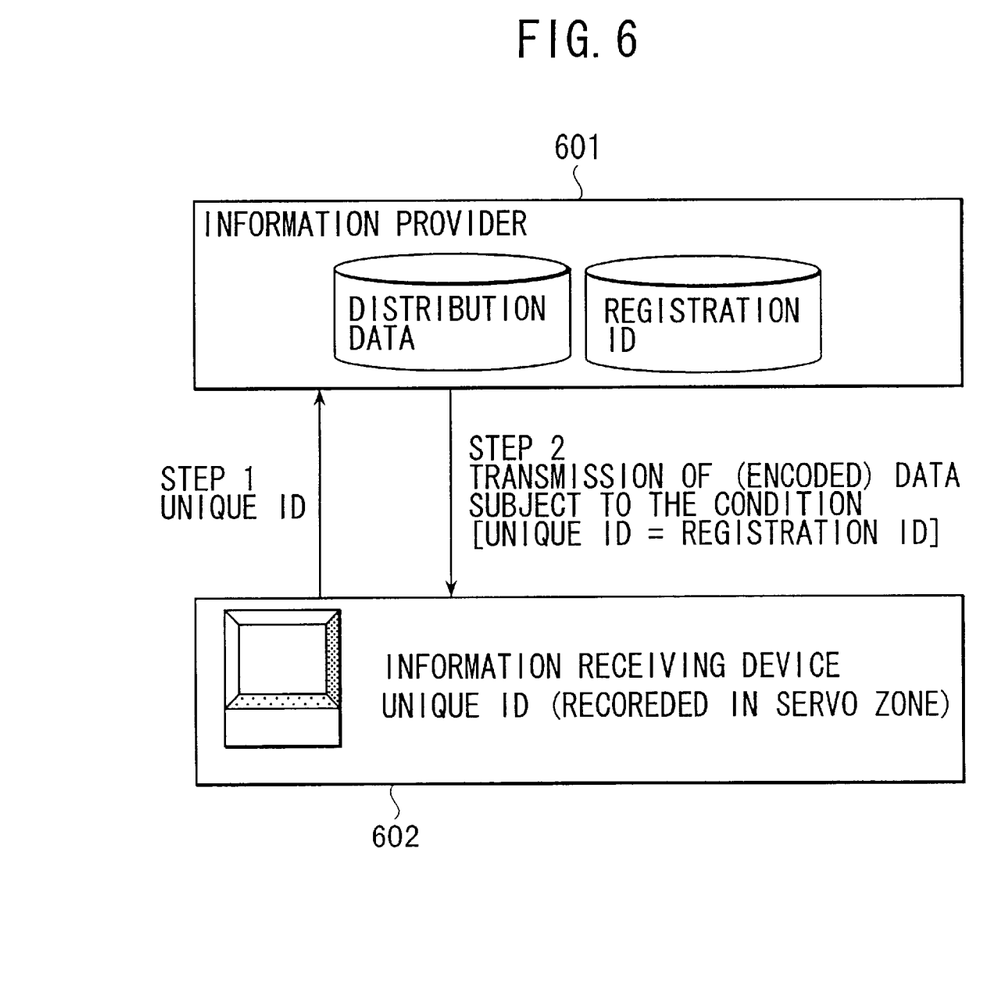
FIG. 6 is a drawing describing information distribution and storage in a storage device according to the information processing device of this invention (1).

An information receiving device 602 shown in FIG. 6 is a personal computer, and is provided with a data transmission means and a device such as a magnetic disk or the like on which data can be recorded. The information receiving device 602 has a construction in which predetermined unique information (ID information) is recorded at a predetermined position of a servo zone part of the medium when it is shipped.

The information receiving device 602 performs ordinary data recording and reproduction using the magnetic disk or other recording medium, and it can read the unique information (ID information), recorded at a predetermined position of a servo zone part of the medium when it is shipped, by executing the ID information read program, for example.

An information provider 601 previously concludes a license agreement with the information receiving side, and at that time registers the unique information (ID information) of the licensed information receiving device 602. The information provider 601 receives the unique information (ID information), read by executing the ID information read program in the information receiving device 602, via communication means such as the Internet, compares the received ID information with the registered ID, and determines whether or not the two match. If the two match, the information provider 601 then certifies that the information receiving device 602 is a valid device, and transmits distribution information to the information receiving device 602.

The ID information used here is ID information recorded in the servo zones of the information recording medium as described above. It is unique information recorded together with servo information when the recording medium is manufactured by a servo writer, and this ID information cannot be rewritten by the user. Therefore, the information provider 601 can specify the system as having received a valid license, and can permit distribution of information to a valid user or storage of same in a storage device.

The information provider 601 may transmit data which has, for example, been encoded with a predetermined key k to the information receiving device 602. In this case, the information receiving device 602 which receives the encoded data performs decoding.

The key k used for this encoding may be a value k (=f (ID)) generated by applying a predetermined function f to the device ID transmitted by the information receiving device 602.

The key k (=f(ID)) is also generated by applying the function f to the ID in the information receiving device 602 in the same way. Using this key k, the encoded audio or image data transmitted from the information provider may be decoded.

Figure 7:
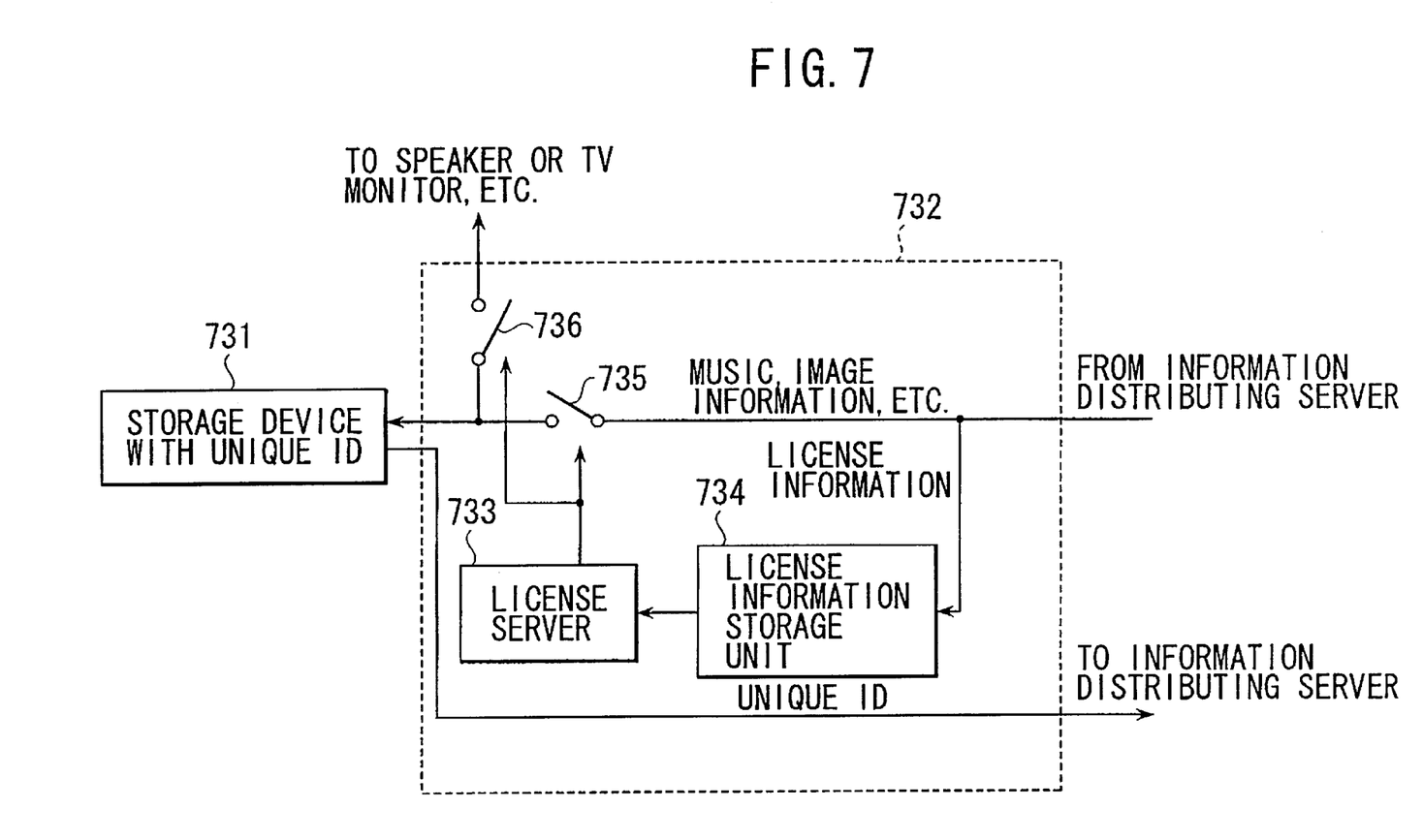
FIG. 7 is a drawing describing information distribution and storage in a storage device according to the information processing device of this invention (2).

Next, the processing will be described when music information or image information is received by a host system comprising the information recording medium of this invention, i.e., a disk drive on which unique ID information is recorded in servo zones, and further comprising a special construction.

In FIG. 7,731 is a storage device such as a hard disk on which unique ID information is recorded in servo zones, i.e., it is the storage device 731 having a unique ID. 732 is a host system connected to the storage device 731 having a unique ID. The host system 732 has a construction capable of receiving information, for example digital information such as music or images, from outside via a communications means such as the Internet.

The storage device 731 having a unique ID on which unique ID information is recorded in servo zones according to this invention is connected to the host system 732, and recording/reproduction of data in the data zones, and reading of ID information, are performed according to commands received from the host system 732.

The processing performed when the host system attempts to receive distribution information such as music and images from an information distributing server, will now be described.

First, unique ID information is read out from the storage device 731 according to a command from the host system 732. This processing may be the reading of unique information (ID information), recorded at a predetermined position of a servo zone part of the medium when it is shipped, by for example executing the ID information read program. The host system 732 transmits the unique ID which was read to the information distributing server.

In the information distributing server which received the unique ID information from the host system 732, license information is generated to store distribution information, e.g. a certain song, on the user's storage device (e.g. hard disk) based on the unique ID of the storage device which was received. This information may be encoded by some method.

The license information generated in the information distributing server is sent out from the information distributing server, received by the host system 732, and stored for each song in a license information storage unit 734 in the host system 732. Information distributed together with license information, for example information about certain songs, is also distributed from the information distributing server.

A license server 733 in the host system 732 compares the unique ID recorded in the servo zone of the storage device having a unique ID, with the license information stored according to song in the license information storage unit 734 which was generated in the information distributing server, and verifies whether this license information is information based on the unique ID read from the storage device 731. When it is verified that this information is based on the unique ID, a switch 735 is closed, and the music or other distribution information can then be stored in the data zones of the storage device 731 having the unique ID. When it is not verified that the license information was generated based on the unique ID, the switch 735 is opened so that storage in the storage device 731 cannot occur.

The comparison, performed by the license server 733, between the unique ID recorded in the servo zone of the storage device 731 having the unique ID with the license information stored according to song in the license information storage unit 734 which was generated in the information distributing server, may for example be performed by using a key assigned to a user who previously received a license from the information distributing server. In this case, the encoded license information is decoded, and it is determined whether or not the unique ID recorded in a servo zone of the storage device 731 having the unique ID is contained in part of the decoded data.

Due to the construction shown in FIG. 7 as described above, users who received a valid license can be definitely identified by the unique ID recorded in a servo zone of the storage device 731, so storage of distributed data in storage devices by unauthorized users can be prevented.

In the construction shown in FIG. 7, the license information storage unit 734 may be a memory such as a RAM, and the license server 733, i.e., the ID comparison means, may be implemented by a means for executing a program which for example decodes encoded license information, and determines whether or not the unique ID recorded in a servo zone of the storage device 71 having the unique ID is contained in a part of this decoded data.

The switch 735 shown in FIG. 7 maybe recording enable means which enables the distribution data transmitted by the information distributing server to be recorded in the storage device 731, for example a means for executing a program which decodes encoded distribution data transmitted by the information distributing server. For example, the decoded distribution data may be stored in the storage device 731 by placing a decoding key which decodes encoded distribution data in the license information decoded by the license server 733, and decoding the encoded distribution data using this decoding key. This is represented by the state when the switch 735 is closed. When the user has no valid ID, the aforesaid decoding key cannot be obtained, so decoding of encoded distribution data cannot be performed. This may be represented by the open state of the switch 735. Therefore, the construction of FIG. 7 may be implemented in an ordinary personal computer by introducing a predetermined processing program without the need for any special hardware.

The comparison, performed by the license server 733, of the unique ID recorded in a servo zone of the storage device 731 having a unique ID with the license information stored according to song in the license information storage unit 734 which was generated in the information distributing server, may also be performed when the distribution data is reproduced.

In this case, the license server 733 compares the unique ID in the storage device 71 with the license information, and performs processing to verify that the license information is information which was generated based on the unique ID read from the storage device 731. When it is confirmed that this information was generated based on the unique ID, a switch 736 is closed, the music or other distribution information is read from the data zones of the storage device 71 having the unique ID, and is then output to speakers or a monitor. When it is not confirmed that the license information is information which was generated based on the unique ID, the switch 736 is opened and reproduction cannot occur.

The switch 736 is a reproduction enable means, and as in the case of the aforesaid switch 735, it may be implemented by a means for executing a program which decodes the encoded distribution data transmitted from the information distributing server. For example, a decoding key for decoding encoded distribution data is placed in the license information decoded by the license server 733. The distribution data stored in the storage device 731 maybe encoded images or music, etc., and when this is reproduced, the encoded distribution data is output to speakers or a monitor by decoding it using the aforesaid decoding key. The state where decoding is possible may be represented by the state where the switch 736 is closed. When the user does not have a valid ID, the aforesaid decoding key cannot be obtained, so decoding of the encoded distribution data stored in the storage device 71 cannot be performed. This state may be represented by the state where the switch 736 is open. Therefore, the construction of the switch 736 in FIG. 7 may be implemented in an ordinary personal computer by introducing a predetermined processing program without the need for any special hardware.

Additional data can be included in the aforesaid license information, for example so as to impose license date limits or to limit the number of times an operation is permitted. If such features are incorporated in a processing program to handle a configuration comprising various limitations, storage or reproduction of the distribution data from the information provider on the user's storage device can be controlled more finely.

This invention has been described in detail above by referring to a specific embodiment. However, it will be understood that various modifications and substitutions of this embodiment can be made by those skilled in the art without departing from the scope or spirit of the invention. In other words, this invention has been disclosed by way of examples which are not to be construed as being limiting. For a precise determination of the essential features of this invention, reference should be made to the claims appended at the beginning of this specification.

What is claimed is:

1. An information processing device comprising a disk-shaped information recording medium permitting data recording and reproducing, wherein said disk-shaped information recording medium comprises:

a data zone permitting data recordings and reproducing, and a servo zone for recording servo information for positioning a head which performs data recording or reproducing relative to said information recording medium, and ID information for identifying the individual information recording medium is recorded in said servo zone, wherein said information processing device comprises:

means for performing data recording and reproducing to and from said information recording medium, ID information read means for reading said ID information from said servo zone, wherein said ID information read means reads said ID information recording servo zone data as ID information based on ID information recording servo zone region information of said information recording medium on which ID information is recorded, and said ID information read means comprises means for executing an ID information read program generated in correspondence with said ID information recording servo zone region information, ID comparison means for performing a comparison of license information generated based on said ID information and said ID information when distribution information from external information providing means is recorded on the information recording medium, and storage enabling means which enables storage of information from external information providing means on said information recording medium only when it is confirmed that said license information is information created based on said ID information as a result of the comparison in said ID comparison means.

2. An information processing device as claimed in claim 1, wherein said storage enabling means is decoding means which performs decoding of encoded information from information providing means, and which decodes encoded information from external information providing means only when it is confirmed that said license information is information created based on said ID information as a result of the comparison in said ID comparison means.

3. An information processing device comprising a disk-shaped information recording medium permitting data recording and reproducing, wherein said disk-shaped information recording medium comprises:

a data zone permitting data recording and reproducing, and a servo zone for recording servo information for positioning a head which performs data recording or reproducing relative to said information recording medium, and ID information for identifying the individual information recording medium is recorded in said servo zone, wherein said information processing device records distribution information from external information providing means on said information recording medium, and comprises:

means for performing data recording and reproducing to and from said information recording medium, ID information read means for reading said ID information from said servo zone, wherein said ID information read means reads said ID information recording servo zone data as ID information based on ID information recording servo zone region information of said information recording medium on which ID information is recorded, and said ID information read means comprises means for executing an ID information read program generated in correspondence with said ID information recording servo zone reunion information, ID comparison means for performing a comparison of license information generated based on said ID information and said ID information when said recorded information is played back, and reproducing enabling means which enables reproducing of recorded information recorded on said information recording means only when it is confirmed that said license information is information created based on said ID information as a result of the comparison in said ID comparison means.

4. An information processing device as claimed in claim 3, wherein said reproducing enabling means is decoding means which performs decoding of encoded information from information providing means, and which decodes encoded information recorded on said information recording medium only when it is confirmed that said license information is information created based on said ID information as a result of the comparison in said ID comparison means.

* * * * *